US008620831B1

(12) United States Patent
Adams

(10) Patent No.: US 8,620,831 B1
(45) Date of Patent: Dec. 31, 2013

(54) STUDENT-CENTERED, CROSS-INSTITUTIONAL CURRICULUM MANAGEMENT SYSTEM APPARATUS AND METHOD

(76) Inventor: Phillip M. Adams, Afton, WY (US)

( * ) Notice: Subject to any disclaimer, the term of this patent is extended or adjusted under 35 U.S.C. 154(b) by 2390 days.

(21) Appl. No.: 10/727,798

(22) Filed: Dec. 4, 2003

Related U.S. Application Data

(63) Continuation of application No. 10/453,241, filed on Jun. 3, 2003, now abandoned.

(51) Int. Cl.
*G06Q 10/00* (2012.01)

(52) U.S. Cl.
USPC .......................................... 705/326; 705/327

(58) Field of Classification Search
USPC ...................... 705/1, 326, 327, 1.1
See application file for complete search history.

(56) References Cited

U.S. PATENT DOCUMENTS

| | | | | |
|---|---|---|---|---|
| 4,714,254 A | | 12/1987 | Calloway | 273/249 |
| 4,921,427 A | | 5/1990 | Dunn | 434/340 |
| 5,306,154 A | | 4/1994 | Ujita et al. | 434/218 |
| 5,810,605 A | | 9/1998 | Siefert | 434/362 |
| 5,904,485 A | | 5/1999 | Siefert | 434/322 |
| 6,126,448 A | * | 10/2000 | Ho et al. | 434/219 |
| 6,334,779 B1 | | 1/2002 | Siefert | 434/322 |
| 6,336,813 B1 | | 1/2002 | Siefert | 434/322 |
| 6,386,883 B2 | | 5/2002 | Siefert | 434/322 |
| 6,507,726 B1 | * | 1/2003 | Atkinson et al. | 434/350 |
| 6,711,618 B1 | * | 3/2004 | Danner et al. | 709/228 |
| 2002/0049743 A1 | * | 4/2002 | Hall | 707/1 |
| 2002/0147656 A1 | * | 10/2002 | Tam et al. | 705/26 |
| 2003/0055842 A1 | * | 3/2003 | Fields et al. | 707/104.1 |
| 2003/0233242 A1 | * | 12/2003 | Wenger | 705/1 |
| 2004/0133546 A1 | * | 7/2004 | Oni | 707/1 |
| 2008/0057482 A1 | * | 3/2008 | Snyder et al. | 434/350 |

OTHER PUBLICATIONS

Curriculum Sequencing (found at http;//www10.org/cdrom/papers/207/node5.html, published Feb. 13, 2001).*
"Data that supports 1 to 1". American Bankers Association. ABA Banking Journal. New York: Oct 2000. vol. 92, Iss.10; p. 60.*
Eguchi, Go and Laurence L. Leff. "Rule-based XML". Artificial Intelligence and Law. Dordrecht: 2002. vol. 10, Iss. 4; p. 283.*

* cited by examiner

*Primary Examiner* — Gabrielle McCormick
(74) *Attorney, Agent, or Firm* — Pate Baird, PLLC

(57) ABSTRACT

Apparatus and methods are provided for managing a student's educational curriculum. A degree dependency graph is created for a student corresponding to a degree sought after at a selected educational institution. The degree dependency graph may be created in accordance with degree requirements, graduation requirements, prerequisite requirements, and the like, provided by the catalog of a selected institution. In addition, a standardized nomenclature may be created using XML tags or other terminology, to identify like information from different educational institutions. The XML tags may be used by a curriculum management system to identify courses from multiple institutions to satisfy requirements of a selected degree program at a selected institution.

19 Claims, 12 Drawing Sheets

Catalog 66

Degree Requirements 80
- General Education 84
- Departmental 86
- Electives 88
- GPA 90
- Other 92

Graduation Requirements 82
- Transfer Credits 94
- Upper Division Credits 96
- Residency 98
- Mix 100
- Other 102

Prerequisites 104

Admission/Matriculation 106
- High School Credits 110
- Language 112
- Entrance Exam Scores 114
- GPA 116
- Other 118

Course Work 108
- GPA 120
- Approval 122
- Other 124

Courses 126
- Course Number 128
- Credit Hours 130
- Description 132
- Prerequisites/Corequisites 134

Schedule 136
- Course Number 138
- Times 140
- Credit Hours 142
- Professor 144
- Location 146
- Other 148

FIG. 3

STUDENT-CENTERED, CROSS-INSTITUTIONAL CURRICULUM MANAGEMENT SYSTEM APPARATUS AND METHOD

RELATED APPLICATIONS

This application is a continuation of U.S. patent application Ser. No. 10/453,241 filed Jun. 3, 2003 now abandoned and entitled STUDENT-CENTERED, CROSS-INSTITUTIONAL CURRICULUM MANAGEMENT SYSTEM APPARATUS AND METHOD.

BACKGROUND

1. The Field of the Invention

This invention relates to education, and more particularly to apparatus and methods for managing a student's postsecondary curriculum.

2. The Background Art

Throughout the world, America has long been admired for its postsecondary educational system. A postsecondary education most generally refers to programs and institutions with formal instructional programs and curricula designed primarily for students who have completed the requirements for a high school diploma or its equivalent. Although all postsecondary educational institutions may be grouped into a single class of institutions, in reality, these institutions may be quite varied in their offerings. For example, postsecondary educational institutions may range from technical schools conferring terminal occupational certificates or awards that are creditable toward a formal degree in less than two years, to four-year degree-granting institutions conferring recognized degrees that require four or more years to complete, to institutions granting graduate degrees that extend past the four-year mark typical of baccalaureate programs.

Despite past successes of the postsecondary education system in the United States, many institutions of higher learning, such as colleges and universities, are facing various crises. For example, the university system in California is currently facing a multi-billion dollar budget deficit. Although much of the deficit may be attributed to overspending due to gross miscalculations of future revenues from investments during the "dot.com" boom of the late 1990s, and to the current downturn of the economy, much of the deficit may be attributed to a faulty or non-market-responsive model for providing education. Moreover, the bursting of the "dot.com" bubble has not only caused significant education budget deficits, but has also depleted college and retirement savings of parents who desire to pay for their children's education.

Much of the failure of the postsecondary educational system as a delivery vehicle for education may be attributed to the fact that the system has been designed as a business model targeting growth and full employment of its departments, rather than an educational model. Some have been so brash as to label the postsecondary educational system "Education Inc."

Certain flaws in the postsecondary education system may exacerbate the problem. For example, a student approaching a college or university is many times referred to a counselor for advisement. These counselors are typically employees or faculty members of the college or university in question. This creates several conflicts of interest.

For example, an employee or faculty member may be biased to advise a prospective student to take classes or participate in courses of study in that persons department, college or university, despite the fact that a more suitable curriculum, in terms of content, focus, cost, location, availability, quality, and the like, may be found at another institution, college, or department. This may result in the student receiving a non-ideal curriculum. A degree that could have taken only four years to complete, may take six years. Classes that may have been taken closer to a student's home, are taken at a more distant institution and at a greater cost. Scenarios such as these may occur because a student has not been provided important information. In fact, there is currently very little comparative shopping occurring between services offered at different educational institutions, or even between colleges or departments within a single university.

Those in business realize the advantages to having multiple vendors or suppliers for a particular product. Maintaining multiple vendors helps to ensure that a product is regularly purchased at the lowest cost, highest quality, and the like. Thus, what are needed are apparatus and methods to create and apply a consumer-oriented model to the postsecondary educational systems extant.

Competition or equal availability between different educational institutions may enable a student to compare and shop for services offered by those educational institutions. Thus, a student may optimize selected preferences such as his or her class schedule, days of the week to take classes, tuition costs, location or timing of courses, and the like. In a sense, what are needed are apparatus and methods to compare features of courses and degree programs as one would compare products, to provide some standard characteristics comparable to those of other commodities.

Therefore, what are needed are apparatus and methods to enable a prospective student to shop for education products or services offered by various educational institutions.

Moreover, what are further needed are apparatus and methods to enable a student to mix and match courses and requirements offered by distinct educational institutions towards completion of a customized or personalized degree program desired.

What is further needed are apparatus and methods to standardize nomenclature used by various institutions for identifying selected types of information and "product" descriptions.

Further needed are apparatus and methods for classifying the information with nomenclature, such that it may be extracted for comparison, and ultimately, for selection and "product" design by individuals.

Also needed are apparatus and methods to enable a student to select preferences with respect to curriculum scheduling, cost, location, and the like. A curriculum for obtaining a degree may then be designed and optimized in accordance with a student's preferences, goals, limitations, or needs.

BRIEF SUMMARY AND OBJECTS OF THE INVENTION

Consistent with the foregoing objects, and in accordance with the invention as embodied and broadly described herein, a method for creating and managing, by a student, an individually customized curriculum of study across multiple educational offerings is disclosed. This method may include selecting, by a student, graduation criteria established by a course catalog corresponding to an educational institution. The graduation criteria may then be organized into a tree structure establishing a hierarchy of requirements to satisfy the graduation criteria. The method may further include mining, over a network, catalog information contained in the course catalog. Information may then be selected from the catalog information to populate the tree structure with courses satisfying the graduation criteria in accordance with the course catalog.

A method in accordance with the invention may subsequently include mining, over the network, other catalog information contained in another course catalog corresponding to another educational institution. Course information may then be selected from this second catalog's information to populate the tree structure with courses satisfying the graduation criteria in accordance with the original course catalog consulted and relied upon.

In order to effectively mine the catalog information over a network, analogous information within each catalog's information may be coded with standardized codes to enable comparison of analogous information. Coding may include identifying or labeling information in each catalog's information with XML tags, and providing the information in the form of XML pages available on the network.

In certain embodiments, coding may include embedding XML tags into existing source code of HTML pages containing catalog information. In other embodiments, coding may include creating, by a third party independent from the educational institutions, XML pages identifying information in the catalog's information with XML tags.

Information in the first and second catalog information may then be mined, over a network, by searching the standardized codes. In certain embodiments, the equivalency of courses offered by the educational institutions may be determined.

A student may also, by a method in accordance with the invention, select preferences with respect to courses used to populate the tree structure. For example, these preferences may be preferred times, preferred days, cost, credit hour load, desired time to graduate, preferred locations to take courses, and the like.

Scheduling information may be gathered with respect to courses used to populate the tree structure. A class schedule may then be created for a student in accordance with the preferences and the scheduling information.

In certain embodiments the graduation criteria selected by the student may include selecting a department or college within an institution, and selecting a degree program offered by the department or college. The selection of graduation criteria will typically depend upon selecting degree program requirements, university graduation requirements, prerequisite requirements, general education requirements, departmental requirements, elective requirements, upper division credit requirements, lower division credit requirements, course mixture requirements, and the like.

In certain embodiments, a method in accordance with the invention may further include importing existing credits of the student into the tree structure prior to populating the tree structure. Likewise, the invention may be implemented over any network, such as the Internet, or virtual Internet structure stored on mass storage media such as a CD-ROM, DVD, or the like.

BRIEF DESCRIPTION OF THE DRAWINGS

The foregoing and other objects and features of the present invention will become more fully apparent from the following description, taken in conjunction with the accompanying drawings. Understanding that these drawings depict only typical embodiments in accordance with the invention and are, therefore, not to be considered limiting of its scope, the invention will be described with additional specificity and detail through use of the accompanying drawings in which:

FIG. 3 is a schematic block diagram illustrating one embodiment of a catalog and a schedule provided by an educational institution;

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of systems and methods in accordance with the present invention, as represented in FIGS. 1 through 12, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Many of the functional units described in this specification have been labeled as modules, in order to more particularly emphasize their implementation independence. For example, modules may be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. For example, a module of executable code could be a single instruction, or many instructions, and may even be distributed over several different code segments, among different programs, and across several memory devices.

Modules may also be implemented in hardware as electronic circuits comprising custom VLSI circuitry, off-the-shelf semiconductors such as logic chips, transistors, or other discrete components. A module may also be implemented in programmable hardware devices such as field programmable gate arrays, programmable array logic, programmable logic devices or the like.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
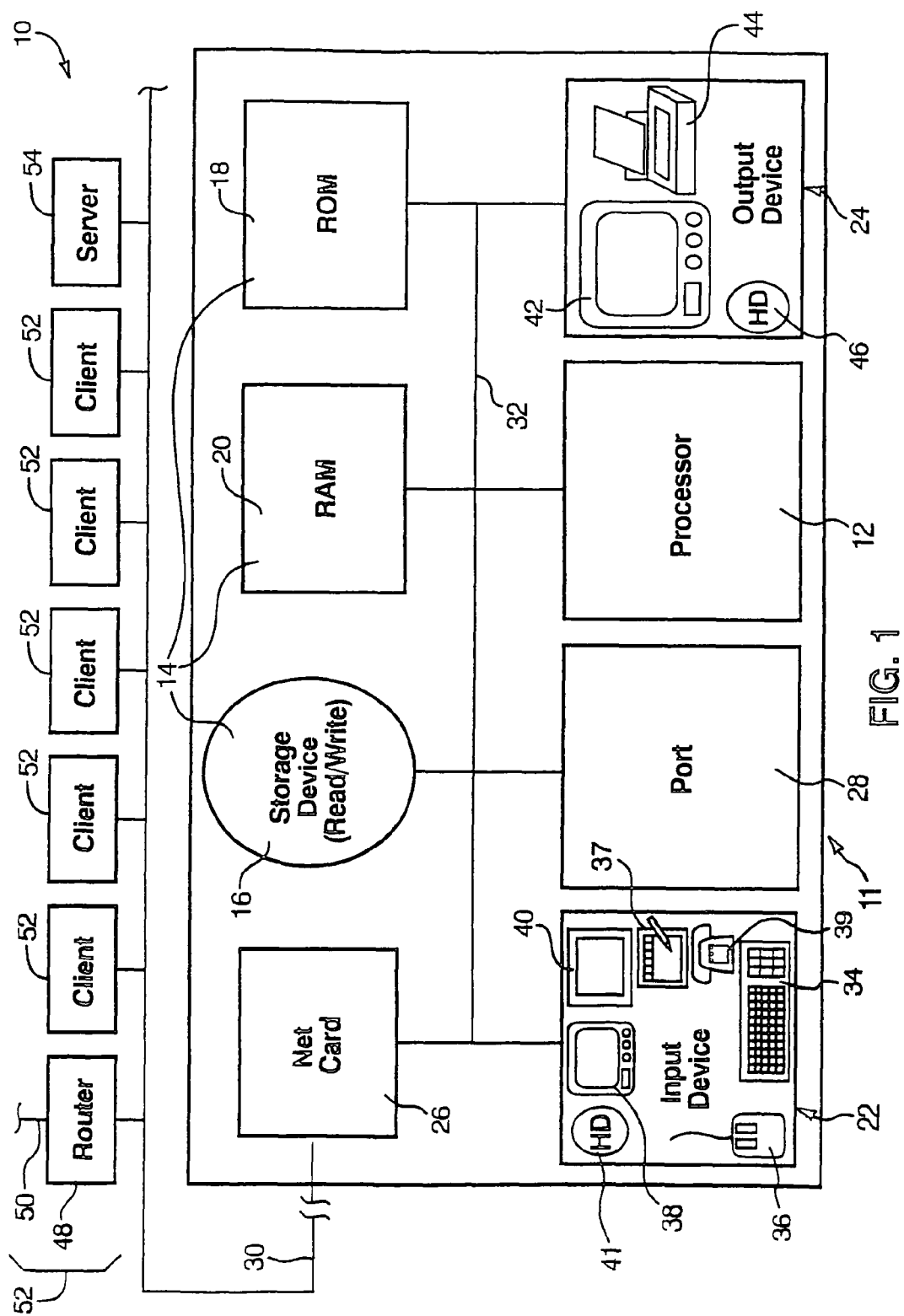
FIG. 1 is a schematic block diagram illustrating one embodiment of a computer system in accordance with the invention.

Referring to FIG. 1, an apparatus 10 may implement the invention on one or more nodes 11, (client 11, computer 11) containing a processor 12 (CPU 12). All components may exist in a single node 11 or may exist in multiple nodes 11, 52 remote from one another. The CPU 12 may be operably connected to a memory device 14. A memory device 14 may include one or more devices such as a hard drive or other non-volatile storage device 16, a read-only memory 18 (ROM 18) and a random access (and usually volatile) memory 20 (RAM 20 or operational memory 20).

The apparatus 10 may include an input device 22 for receiving inputs from a user or from another device. Similarly, an output device 24 may be provided within the node 11, or accessible within the apparatus 10. A network card 26 (interface card) or port 28 may be provided for connecting to outside devices, such as the network 30.

Internally, a bus 32, or multiple buses 32, may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36 or stylus pad 37. A touch screen 38, a telephone 39, or simply a telecommunications line 39, may be used for communication with other devices, with a user, or the like. Similarly, a scanner 40 may be used to receive graphical inputs, which may or may not be translated to other formats. The hard drive 41 or other memory device 41 may be used as an input device whether resident within the node 11 or some other node 52 (e.g. 52, 54, etc.) on the network 30, or from another network 50.

Output devices 24 may likewise include one or more physical hardware units. For example, in general, the port 28 may be used to accept inputs into and send outputs from the node 11. Nevertheless, a monitor 42 may provide outputs to a user for feedback during a process, or for assisting two-way communication between the processor 12 and a user. A printer 44, a hard drive 46, or other device may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 11, 48, 52, 54) may have various communication capabilities.

In certain embodiments, a minimum of logical capability may be available in any node 52. Note that any of the individual nodes 11, 48, 52, 54 may be referred to, as may all together, as a node 11 or a node 52. Each may contain a processor 12 with more or less of the other components 14-46.

A network 30 may include one or more servers 54. Servers may be used to manage, store, communicate, transfer, access, update, and the like, any practical number of files, databases, or the like for other nodes 52 on a network 30. Typically, a server 54 may be accessed by all nodes 11, 52 on a network 30. Nevertheless, other special functions, including communications, applications, directory services, and the like, may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components 12-46 may need to communicate data with one another. A communication link may exist, in general, between any pair of devices.

Figure 2:
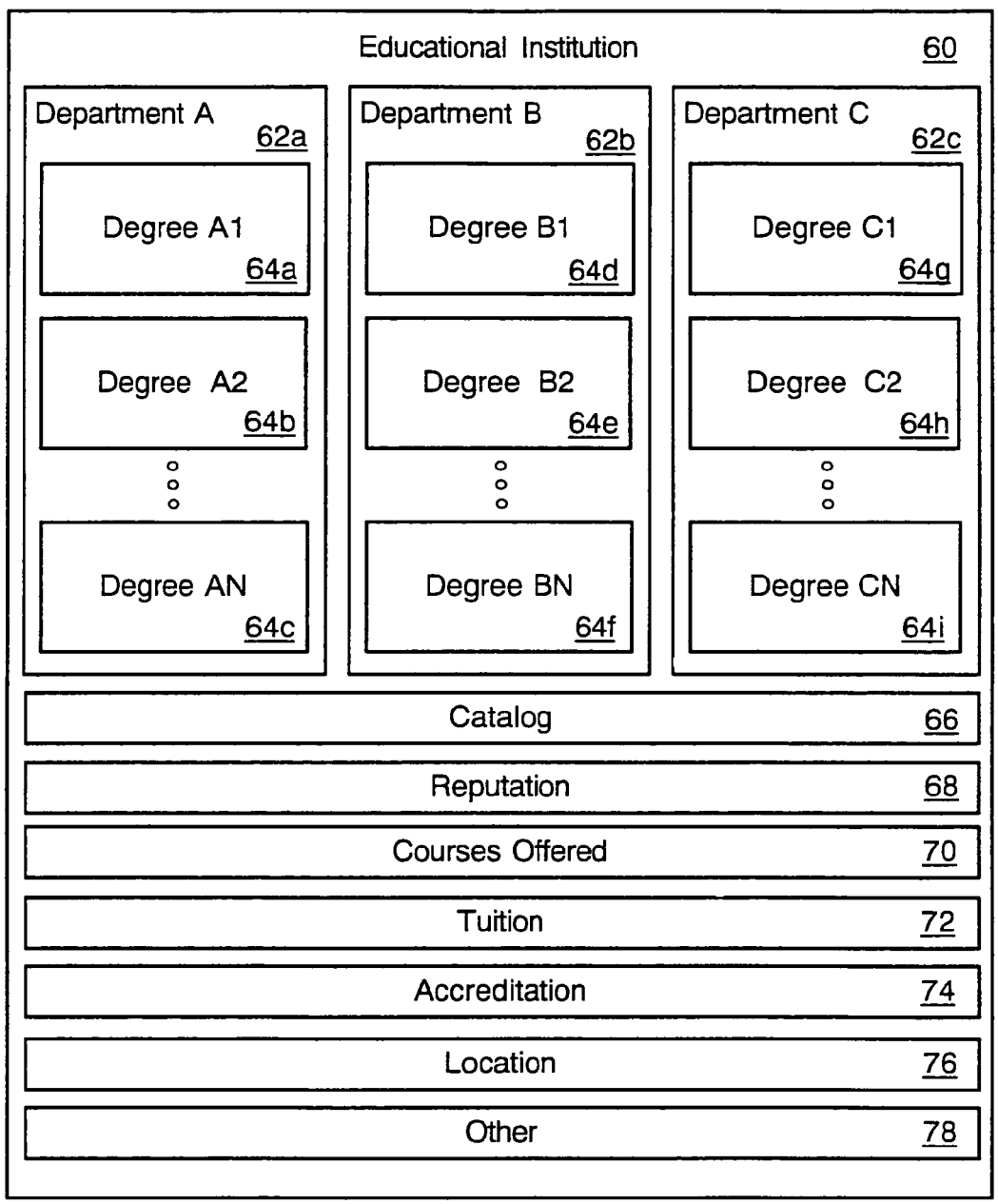
FIG. 2 is a schematic block diagram illustrating one embodiment of the organization of an educational institution and factors that may motivate a student to attend an educational institution.

Referring to FIG. 2, an educational institution 60 may be organized in such a way as to divide its curriculum into specialties or degree programs. Moreover, an educational institution 60 may have various characteristics that might motivate a student to pursue a degree or a certificate at that institution 60.

For example, an educational institution 60 may be organized into multiple departments 62, colleges 62, and the like, thereby providing a prospective student a variety of educational offerings. Likewise, each department 62 may offer several degrees 64a-c typically related to one another. Similarly, other departments 62b, 62c within the institution 60 may offer various related degrees programs 64d-i, or courses of study 64d-i. Typically, such as when attending a four-year postsecondary institution 60, a student attends with the goal of achieving a degree 64 offered by the institution 60, or departments 62 contained therein.

Most educational institutions 60 provide a catalog 66 to current and prospective students defining requirements for earning a degree 64 from the institution 60. In fact, the catalog 66, as of the date of a student's admission, may be considered a contract between the student and the institution 60 defining the requirements on each of the parties.

Certain factors may influence a student to attend one educational institution 60 as opposed to another 60. Because of differences in faculty, reputation 68, courses offered 70, tuition expenses 72, accreditation 74, location 76, and other factors 78 like cost and schedule, a degree at one educational institution 60 may be valued or sought more by a student, an employer, or society in general, than a degree at another educational institution 60. Thus, whatever the path may be, a student may desire that the end award or degree be granted from a preferred institution 60. For example, although a student may attend a community college or earn credits from other institutions 60, a student may desire to transfer those credits to a preferred educational institution 60 toward a selected degree 64 at that institution 60.

As stated, the reputation 68 of an educational institution 60 may be an important factor when choosing an educational institution 60 from which to graduate. Reputation 68 may be a rather subjective measurement. For example, because of an institution's faculty members, ranking by an independent reporting agency, supposed intelligence of attending students, diversity, or the like, it may be perceived that a degree 64 from a particular institution 60 is more valuable to a student than another. Thus, a student may desire a degree at a selected institution 60 for no other reason other than its reputation 68, or any other single perceived advantage that may come as a result.

Other factors that may influence a student to pursue a degree or to take courses at a particular educational institution 60 may include courses 70 or degrees 64 offered by the institution 60, and affordability of tuition expenses 72. In addition, an institution's accreditation 74 may be important. That is, in certain fields or occupations, a degree 64 may be required from an institution 60 that is accredited by a government agency, an independent agency, or the like.

In certain instances, an institution's location 76 may be the most important factor to a student when selecting an educational institution 60. Some students may have the aptitude or credentials to attend a more distinguished or reputable institution 60, but may choose an institution 60 simply because of its proximity to home or family. Likewise, other factors 78 may be important to a student when choosing an educational institution 60 from which to graduate.

Referring to FIG. 3, a catalog 66 may contain information and requirements necessary to graduate from a particular institution 60. For example, a catalog 66 may contain a number of degree requirements 80. Degree requirements 80 may include various criteria necessary for a student to graduate from a particular college 62 or department within the institution 60. For example, degree requirements may include required general education courses 84. A student may be required to complete many of these courses 84 before being accepted into an upper division program or into a particular department 62 or college 62 within an institution 60.

Several categories of courses may be classified as general education courses 84. For example, general education courses 84 may include federally mandated courses 84, state mandated courses 84, or courses 84 mandated by a particular institution 60. In addition, an institution 60 may require that a certain number of credit hours or a certain percentage of a student's overall curriculum be comprised of general education courses 84.

Degree requirements 80 may also include required departmental courses 86 teaching subject matter relevant to a chosen degree program 64. Departmental requirements 86 may include courses or requirements that are required by a department 62 or college 62 within the institution 60. Finally, degree requirements 80 may include electives 88. Electives 88 usually refer to courses or requirements that may or may not be related to a particular degree 64, but may be selected at the discretion or interest of a student.

Degree requirements 80 may include criteria such as a student's grade point average (GPA) 90. That is, unless a student has achieved a specified GPA 90, he or she may not be admitted into a department 62 or college 62 within the institution 60. Thus, several layers of admission may exist after initial admission into an educational institution 60. In addition, other actions 92 or criteria 92 may be required to satisfy degree requirements 80.

A catalog 66 may also include graduation requirements 82 necessary for graduation from a selected institution 60. Graduation requirements 82 may include requirements with respect to the transfer of credits 94 from one institution 60 to another, requirements for upper division credits 96, credits earned during residency 98, a mixture 100 of courses, and other requirements 102.

Because different institutions 60 may offer different degree programs 64, courses taken at one institution 60 may or may not readily be accepted for credit at another institution 60. Thus, a student may lose a certain number of credits earned at one institution 60 when transferring to another 60. Graduation requirements 82 may also include a number of upper division credits 96. That is, certain classes may be designated as upper and lower division courses, each satisfying different requirements.

Graduation requirements 82 may also include certain residency requirements 98. That is, although an institution 60 may accept a certain number of transfer credits 94, the institution 60 may also require that a certain number of courses be taken at the graduating institution 60. These requirements 98 may exist to ensure that an institution 60 receives compensation for and control of granting a degree 64. In other instances, graduation requirements 82 may require a certain mix 100 of courses within a particular degree program 64. That is, an institution 60 may require that courses such as general education courses 84, departmental courses 86, and elective courses 88, be taken in specified proportions as part of a degree program 64. Likewise, other requirements 102 may be specified, as needed, to satisfy graduation requirements 82.

A catalog 66 may specify certain prerequisites 104 such as admission or matriculation prerequisites 106, and course work prerequisites 108. For example, admission or matriculation prerequisites 106 may include requirements for selected high school credits 110, proficiency in a native or second language 112, entrance exam scores 114 such as an SAT or ACT score 114, high school GPA 116, or other prerequisites 118. Course work prerequisites 108 may refer to course work 108 needed to be admitted into a selected institution 60. Course work prerequisites 108 may include requirements for a selected GPA 120 earned taking a course, series of courses, or course of study, approval 122 from an authority to give credit to a selected course, or other requirements 124.

A catalog 66 may also include a list of courses 126 offered by an institution 60. Each course 126 may be assigned a course number 128, a number of credit hours 130, a description 132 of subject matter taught by the course 126, classes that satisfy prerequisite or co-requisite requirements 134 of the course 126, and the like.

A course schedule 136 will usually be issued periodically by an institution 60. The course schedule 136 may contain information needed to register for and attend selected courses 126. Since a course schedule 136 may be dependent on a number of factors, the schedule 136 is typically provided separately and at a later time than the catalog 66. For example, the course schedule 136 may be dependent on the availability of faculty, student demand, classroom availability, and the like. The schedule 136 may provide course numbers 138 corresponding to each course 126, days and times 140 courses 126 are offered, credit hours 142 assigned to each course 126, faculty 144 assigned to each course, location 146 of each course, and other information 148, as needed.

Figure 4:
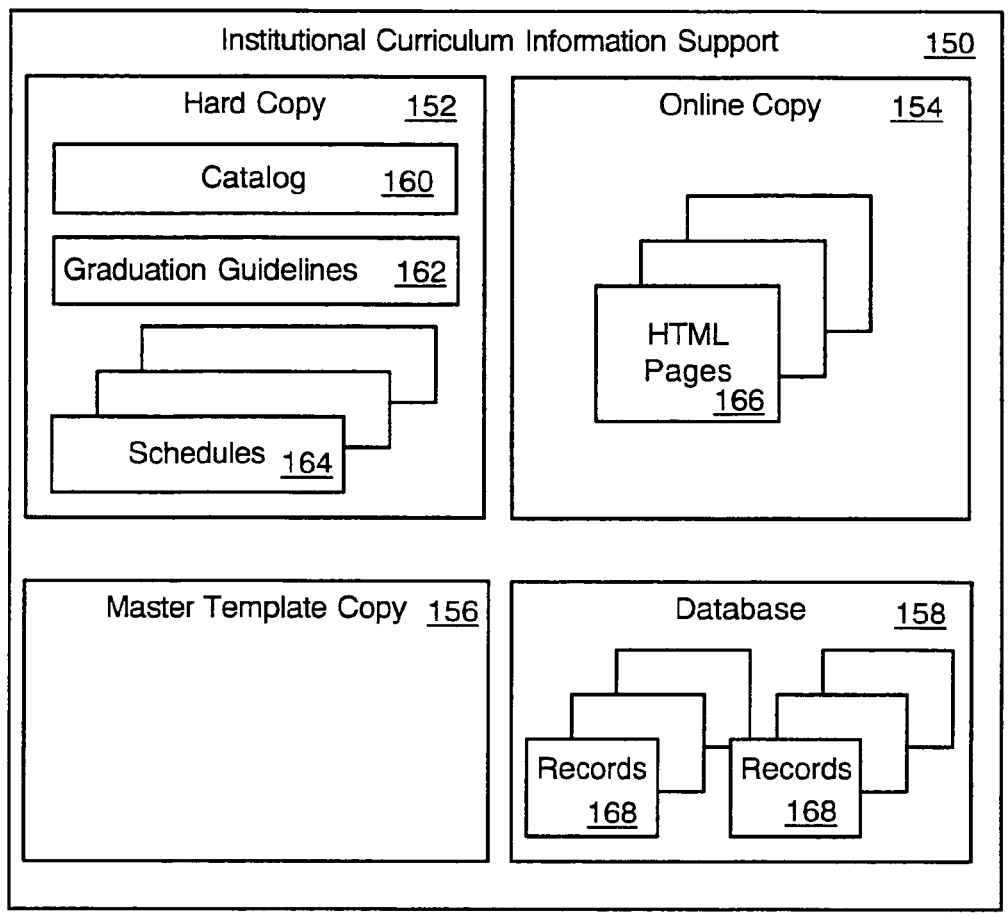
FIG. 4 is a schematic block diagram illustrating one embodiment of institutional curriculum information support provided by an educational institution.

Referring to FIG. 4, various entities within an educational institution 60 may be responsible for providing institutional curriculum information support 150. Moreover, various methods for distribution of institutional curriculum may be used. For example, an institution 60 may produce hard copies 152 of catalogs 160, graduation guidelines 162, and course schedules 164. One advantage of hard copies 152 is that they may be distributed through the mail, as well as provide a tangible record of institutional curriculum. In addition, hard copies 152 may provide the primary means of providing information to those lacking electronic means of communication, such as the Internet. Since catalog 160 and graduation guidelines 162 are usually created far in advance of and less frequently than documents such as course schedules 164, they will typically be separate documents 160, 162.

As the Internet and other electronic communication means become more prevalent, online copies 154 of catalogs 160 and course schedules 164 may often be provided. These online copies 154 may be provided in the form of HTML pages, 166 posted on the Internet, or other documents posted online on an institution's intranet. Many institutions 60 may design elaborate web sites consisting of numerous pages connected by hyperlinks. However, since few standards exist for uniformly presenting educational information, desired information may be hard to find. Thus, apparatus and methods are needed to mine or extract information corresponding to selected institutions 60, such that it may be easily viewed, organized, and compared by individuals.

In certain instances, an institution 60 may maintain a master template copy 156 of institutional curriculum. The master template copy 156 may be used so persons or entities within the institution 60 may add, modify, or delete information from the institution's catalogs 160, graduation guidelines 162, or schedules 164, as needed. The master template copy 156 may be formatted for printing as a hard copy 152, or online copy 154. Information in the master template copy 156 may be stored in a database 158 in the form of records 168. Each record 168 may correspond to a particular department 62, degree 64, course 70, student, faculty member, or the like.

Figure 5:
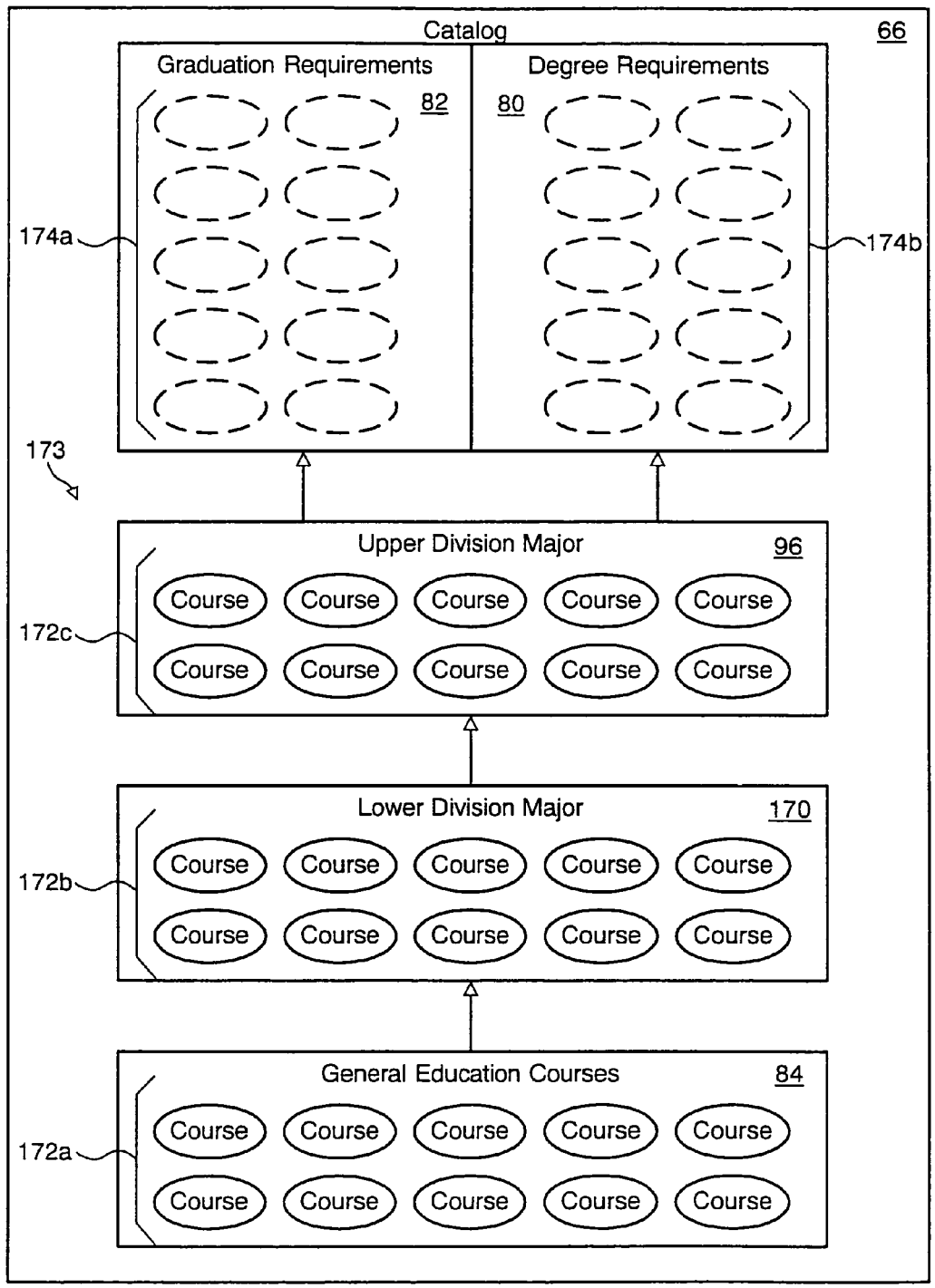
FIG. 5 is a schematic block diagram illustrating one embodiment of a hierarchy or flow diagram of courses taken by a student to complete a degree program.

Referring to FIG. 5, courses 172 may be organized into a hierarchy 173. The hierarchy 173 illustrates an order or sequence of courses 172 that should be taken by a student. These courses 172 satisfy graduation 82 and degree 80 requirements provided by the catalog 66. For example, the hierarchy 173 may be divided into general education courses 84, lower division major courses 170, and upper division major courses 96. Electives 88 may also be required to earn a degree 64 and graduate from an institution 60. However, these electives 88 may or may not be taken at any time during a degree program 64 and, therefore, are left out of the hierarchy 173 in this example.

For example, a student may need to take a specified number of general education courses 84. General education courses 84 may provide a basis or foundation for further study, and may also indicate a student's ability to succeed in upper division courses 96 in a degree program 64. Once general education courses 84 are completed, a student may or may not be admitted into a college 62 or department 62 to finish a degree program 64. Lower division major courses 170 may or may not be taken by a student before being admitted into a particular degree program 64. Lower division major courses 170 may include those courses 170 directly applicable to the student's degree program 64. In addition, lower division major courses 170 may serve as prerequisites for upper division major courses 96.

Upper division major courses 96 refer to those courses 96 directly applicable toward a selected degree program 64. Upper division major courses 96 are usually more advanced courses 96 taken during the final two years of a four-year degree program 64. The courses 84, including the general education 84, lower division major 170, and upper division major courses 96, may be used to satisfy requirements 174a, 174b prescribed by the graduation 82 and degree 80 requirements. Once these requirement 174 are satisfied, a student should be entitled to a degree 64.

Figure 6:
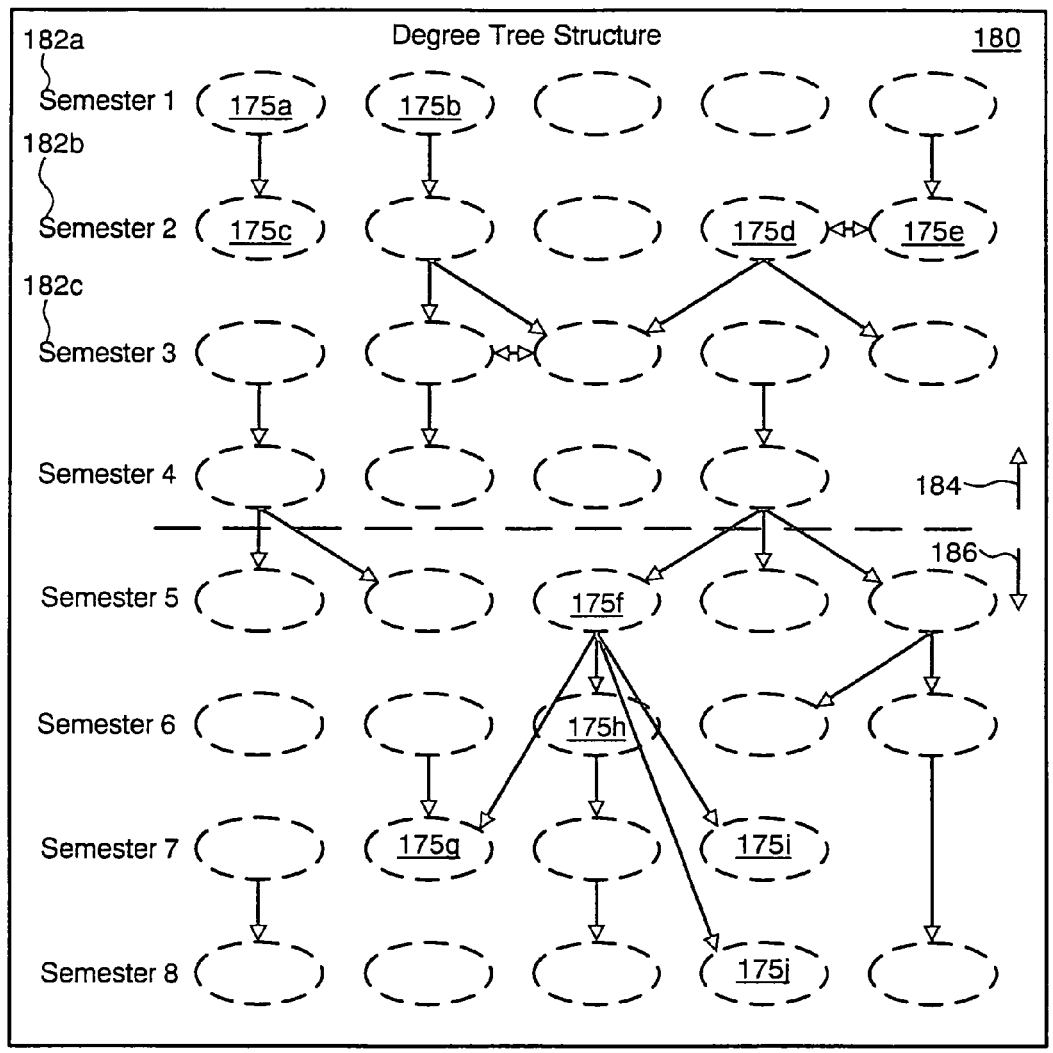
FIG. 6 is a schematic block diagram illustrating one embodiment of a degree tree structure depicting requirements and relationships between requirements corresponding to a selected course of study or degree program.

Referring to FIG. 6, while continuing to refer generally to FIG. 5, requirements 175 may be organized into a degree dependency graph, such as a degree tree structure 180. A degree tree structure 180 simply represents one example of a dependency graph that may be used in accordance with the invention. Other types of dependency graphs may include linked lists, double linked lists, content-addressable memory structures, networks, or other topologies.

A degree tree structure 180 may be considered a map or path to earn a degree 64. For example, requirements 175 or entries 175 within a degree tree structure 180 may be satisfied by general education 84, lower division major 170, upper division major 96, and elective courses 88 satisfying the graduation 82 and degree 88 requirements. The degree tree structure 180 may show relationships between requirements 175, such as prerequisites 175a for other courses 175c.

Likewise, other courses 175d, 175e may be corequisites within the degree tree structure 180. Some courses 175f may serve as prerequisites for multiple other courses 175g-j. If desired, the degree structure 180 may be divided up into a series of quarters, trimesters, or semesters 182a-c so a time may be estimated for completing a degree 64.

For example, selected courses may be taken during a first semester 182 while other selected courses may be taken during a second semester 182b. Likewise, the degree tree structure 180 may be divided into courses 184 taken before admission to a degree program 64, and courses 186 that are taken after admission to a degree program 64. Various requirements 175 within the degree tree structure 180 may be satisfied by several different courses 126. Others may be satisfied only by completing a specific course.

As stated, the degree tree structure 180 represents a path or map to complete a degree 64 at a selected institution 60. However, once the degree tree structure 180 is established, a student may be able to satisfy particular requirements 175 at other more preferred institutions 60. Thus, once the degree tree structure 180 is established, a student may be able to take courses 126 at another institution 60. This may enable a student to more efficiently achieve a degree 64.

Figure 7:
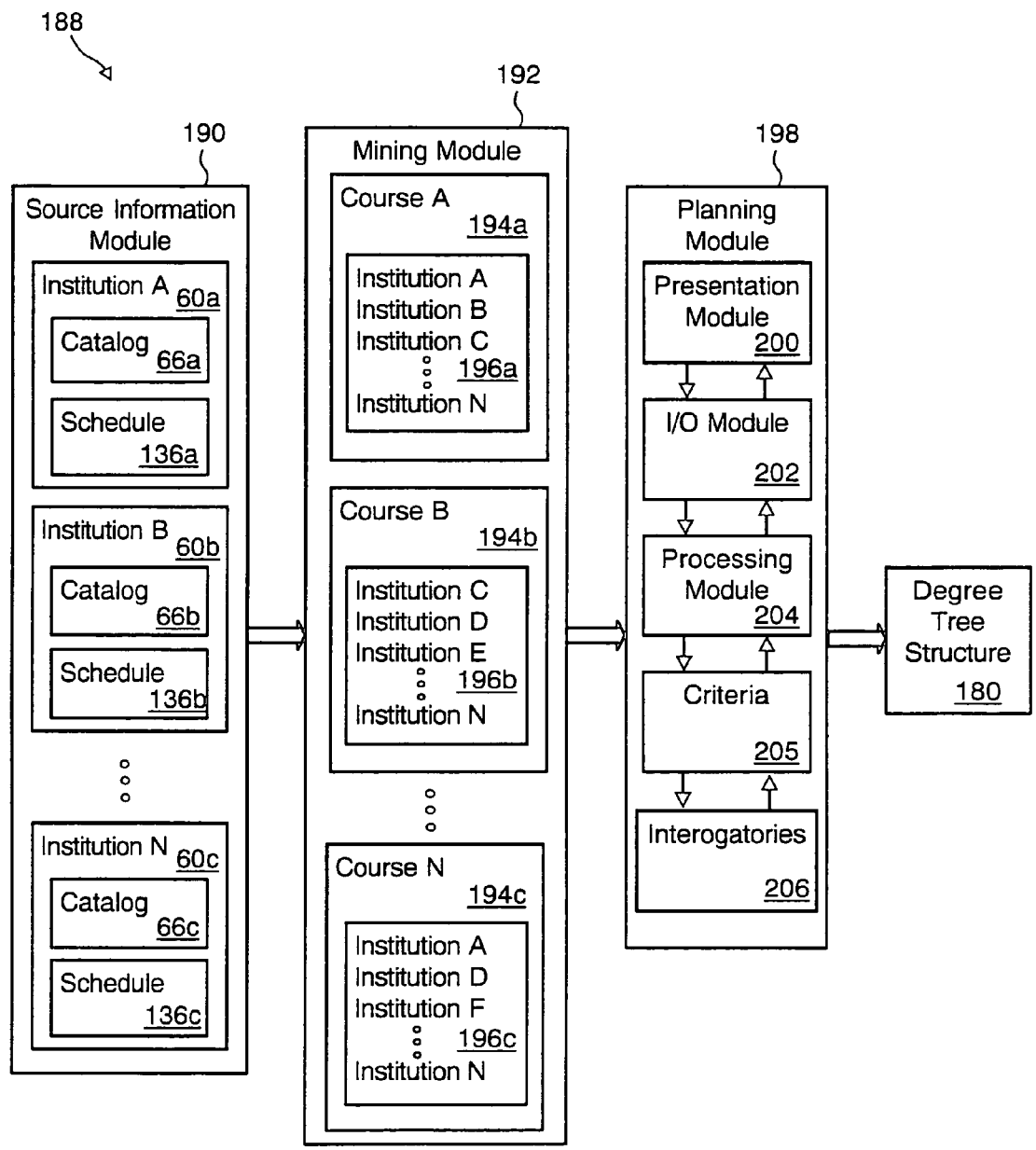
FIG. 7 is a schematic block diagram illustrating one embodiment of a process for identifying degree program information and course information offered by multiple educational institutions, mining the information, and planning a course of study using the information.

Referring to FIG. 7, a process 188 for managing a student's curriculum may include a source information module 190, a mining module 192, a planning module 198, and a degree tree structure 180. A source information module 190 may gather information from multiple institutions 60a-c. Catalogs 66a-c and course schedules 136a-c may be gathered from each institution 60a-c.

The information from catalogs 66a-c and course schedules 136a-c may be sought or otherwise received by a mining module 192. The mining module 192 may search the catalog 66a-c and course schedule 136a-c information for information relevant to a student's degree program 64. For example, certain requirements within a student's degree program 64 may be satisfied by a course 194a offered by several different institutions 196a. A list 196a may be compiled to include institutions 196a offering selected courses 194a or their equivalents 194a.

Likewise, with respect to other courses 194b, 194c, lists of institutions 196b, 196c offering the course 194b, 194c or an equivalent 194b, 194c may be compiled. The lists 196a-196c may contain several institutions 60 in common or others 60 that are unique to a single list 196a-c.

Once relevant information is extracted by the mining module 192, the information may be received by a planning module 198. A planning module 198 may process the information, including courses 126 and course schedules 136a-c, to satisfy requirements in the degree tree structure 180. A planning module 198 may be composed of various modules, including, but not limited to, a presentation module 200, an I/O module 202, a processing module 204, a criteria module 205, and an interrogatories module 206.

A presentation module 200 may present, to a user, information corresponding to courses 126, degree programs 64, course schedules 136, catalogs 66, and the like for a selected institution 60 or institutions 60. The presentation module 200 may further present to a student, a degree tree structure 180 and courses 126 used to satisfy requirements within the tree structure 180. An I/O module 202 may have the primary task of inputting and outputting information on courses 126, degree programs 64, institutions 60, course schedules 136, catalogs 66, degree tree structures 180, and the like from the planning module 198.

A processing module 204 may process information on courses 126, degree programs 64, course schedules 136, and the like, and may optimize the information to fit within a student's degree tree structure 180. A criteria module 205 may work in coordination with the processing module 204 to compare information received from the mining module 192 to certain criteria and preferences selected by a student. Finally, an interrogatories module 206 may receive from a student, or other individual, preferences such as schedule, cost, location, credit hour load, and the like, with respect to selected courses 126, degree programs 64, institutions 60, and the like.

Figure 8:
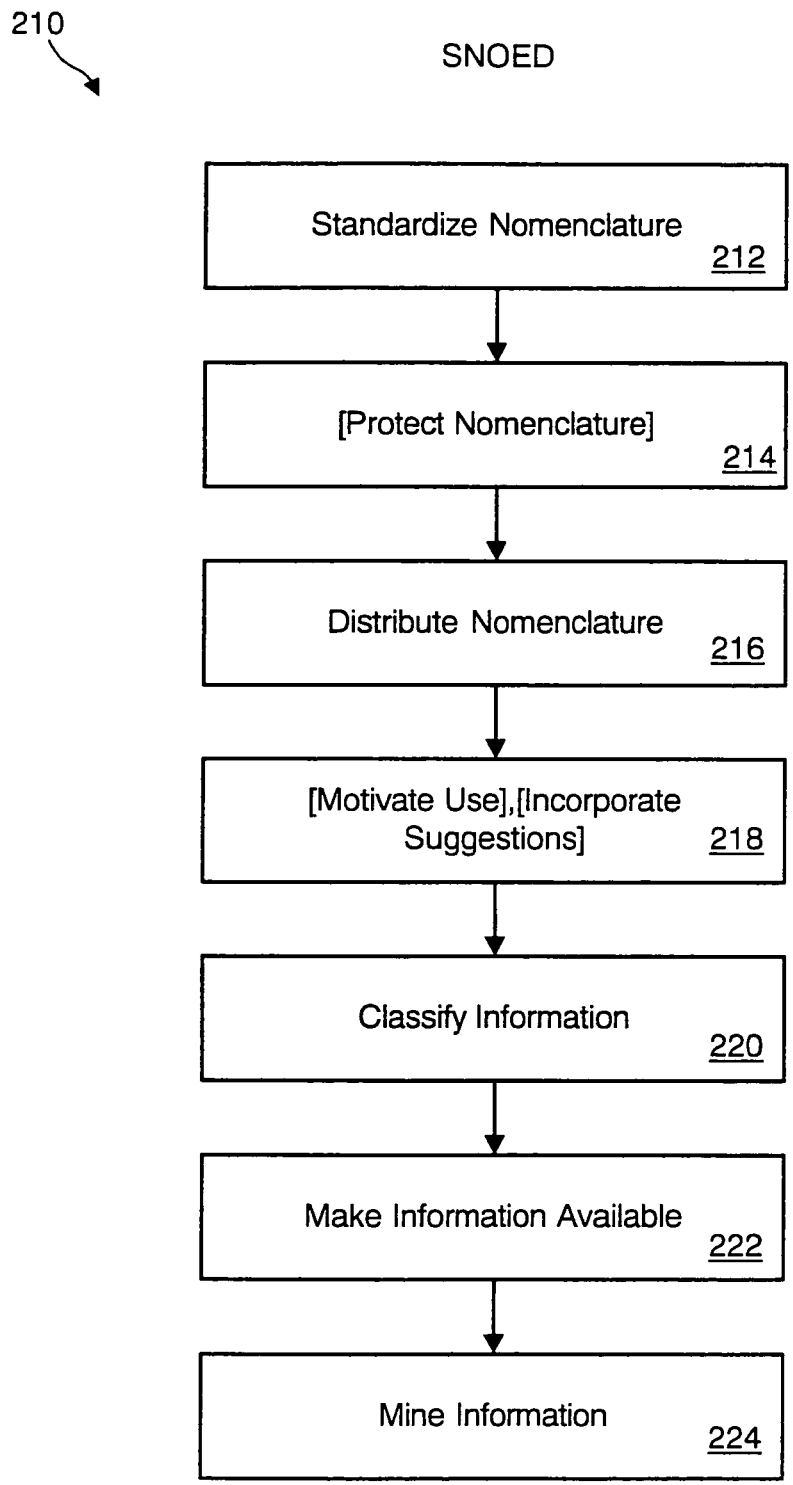
FIG. 8 is a flow chart illustrating one embodiment of a process that may be used to create and distribute a standardized nomenclature for identifying various types of information with respect to an educational institution.

Referring to FIG. 8, dissimilar words, terminology, or concepts used to describe the same information or idea may decrease the efficiency of finding and using the information. Information known to one individual may go undiscovered by another individual simply because he or she has failed to identify or search for the proper words, terminology, or concepts. For example, with respect to educational institutions 60, information with respect to courses 126, degree programs 64, and the like, may be described very differently, thus making the extraction or comparison of such information very difficult. In order to overcome this difficulty, standardized nomenclature is needed to identify like information from different educational institutions 60.

A process 210 for describing institutional information with standardized words, terminology, and concepts, such that it may be easily extracted and compared, may include creating a standardized nomenclature 212. The standardized nomenclature 212 may classify types of information within an educational institution 60. For example, terms within a standardized nomenclature 212 may be created for institutions 60, catalogs 66, departments 62, degrees 64, courses 126, information corresponding to courses 126, course schedules 136, and the like.

A process 210 may or may not include a step for protecting the nomenclature 214. Protecting the nomenclature 214 may include acquiring patents, copyrights, trademarks, or the like necessary to protect and maintain the integrity of a system of words, terminology, concepts, and the like, used to construct a standardized nomenclature 212.

Once the nomenclature 212 is created, it may be distributed 216 to various educational institutions 60 offering courses 126, degree programs 64, and the like. Distribution 216 may include providing reference materials to each educational institution 60, identifying terminology within the nomenclature 212, and identifying information it is intended to classify. Once distributed 216, the process 210 may optionally include a step to motivate 218 use of the nomenclature 212. Motivation 218 may include providing incentives, information, materials, educational workshops, seminars, and the like, informing institutions 60 of the benefits of adopting the nomenclature 212. The creator of the nomenclature may also incorporate suggestions 218, received from educational institutions 60, into the nomenclature 212. Incorporating suggestions 218 may include modifying, adding, or deleting terms or terminology from the nomenclature 212.

Once adopted, information such as course information, degree information, course schedule information, institutional information, faculty information, and the like may be classified 220 according to the nomenclature 212. Classification 220 may include labeling or identifying information within an institution 60 using the nomenclature 212. Once the information is classified 220, the information may be made available, such as on the Internet, to students, prospective students, or organizations dedicated to gathering, comparing, and providing educational information to the public.

The information available from institutions may then be mined 224 by searching for information with respect to institutions 60, courses 126, degrees 64, course schedules 136, and the like, using the nomenclature 212. For example, mining may occur over the Internet. Mining 224 may include extracting from all available information, the desired and relevant information, such as information corresponding to courses 126, degree programs 64, institutions 60, catalogs 66, course schedules 136, and the like, that is organizable and comparable.

Figure 9:
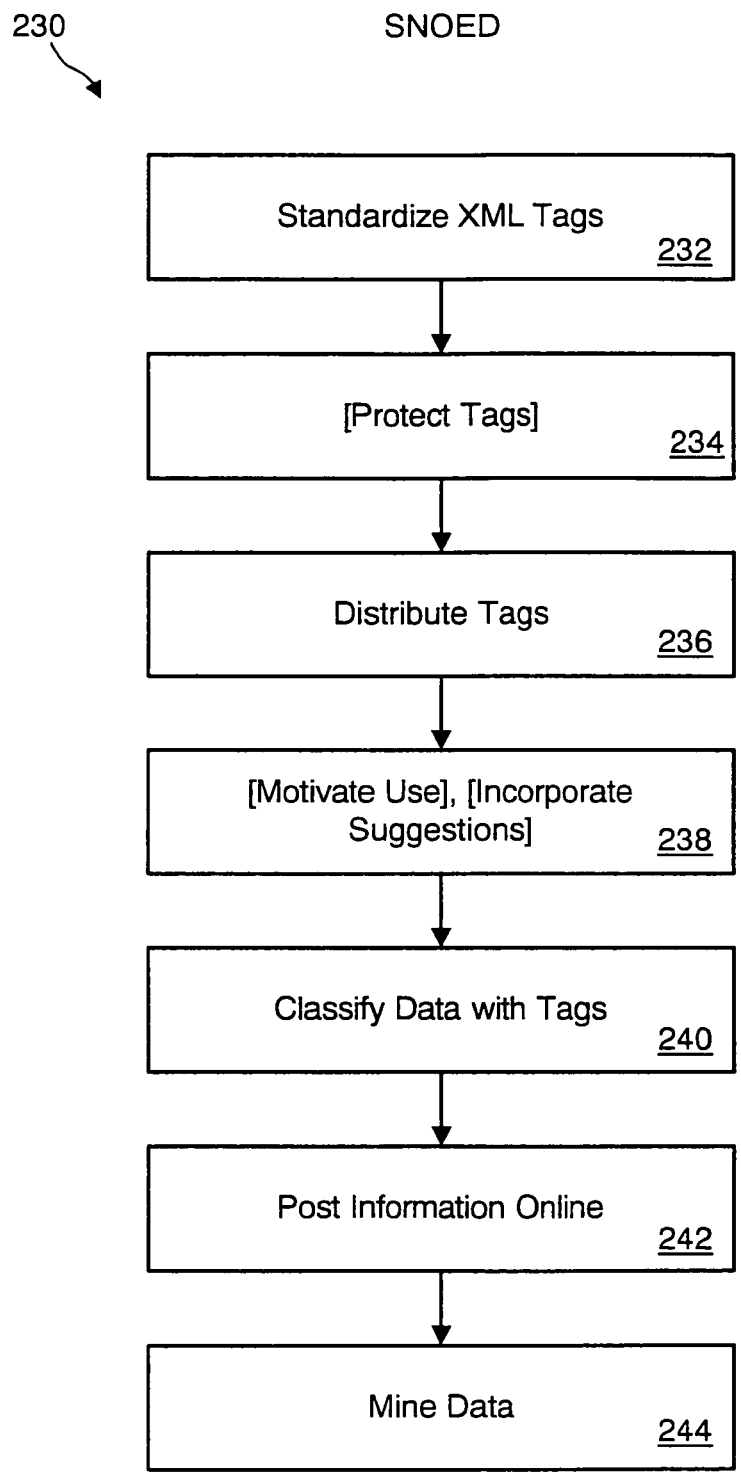
FIG. 9 is a flow chart illustrating one embodiment of a process for identifying types of information at educational institutions using XML tags.

Referring to FIG. 9, for example, in one embodiment, a process 230 for providing a standardized nomenclature to an educational institution 60 may include creating a standardized set of XML tags 232. XML is a standard for describing data that may be used to define data elements in web pages and documents transmitted between businesses. XML, similar to HTML, uses tags to identify certain types of data. However, whereas HTML is used primarily to define how elements are displayed, XML may be used to define what type of data those elements contain. In addition, whereas HTML uses predefined tags, XML allows tags to be defined, as needed, by a developer. Thus, data items such as an institution 60, departments 62 or colleges 62 within an institution 60, degrees 64, courses 126, course schedules 136, and the like, may be identified with standardized tags in accordance with the invention.

Once standardized tags 232 are created, the tags may optionally be protected 234. For example, as described previously standards, publications, agreements, patents, copyrights, trademarks, and the like, may be used to provide some degree of integrity and protection 234. Subsequently, the tags may be distributed 236 to various educational institutions 60. Distribution 236 may include providing education and reference materials describing the tags and information to be identified by the tags.

Once the tags are distributed 236, the process 230 may optionally include motivating the institution 60 to use the tags. In addition, a creator of the tags may optionally incorporate, into the tags 232, suggestions received from institutions 60. Once the tags 232 are distributed 236, institutions 60 or other organizations may classify 240 information such as courses 126, degrees 64, course schedules 136, institutions 60, and like information with the tags 232.

Classifying 240 information may include taking information included in HTML web pages of an institution 60 and creating XML pages identifying the same information with XML tags 232. In other embodiments, an institution 60 may simply embed XML tags 232 within existing HTML pages. In other embodiments, an organization or entity independent from an educational institution 60 may acquire information from an institution 60 from hard copies, HTML pages, or the like, and identify information within these sources with XML tags 232.

Once information is classified 240 with the XML tags 232, the information may be posted 242 online, such as over a subscription service or on the Internet, where it may be accessed and mined by individuals and organizations. Mining data 244 may refer to the process of extracting, comparing, organizing, presenting, and the like, information corresponding to educational institutions 60 identified by the XML tags 232.

Figure 10:
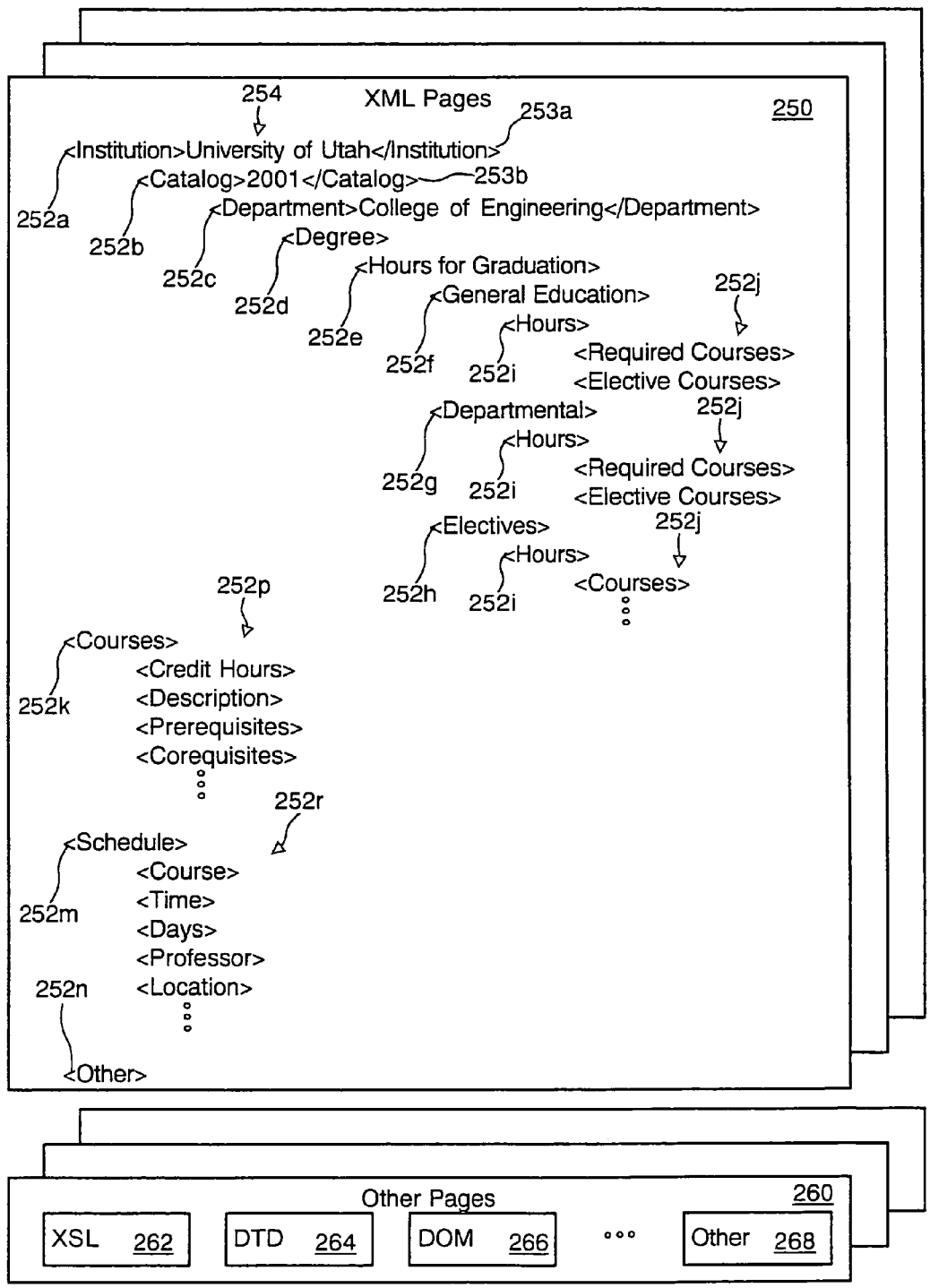
FIG. 10 is a schematic block diagram illustrating one embodiment of standardized XML tags used to identify various types of information within XML pages.

Referring to FIG. 10, XML pages 250 may be created to identify various types of information 252. For example, in one embodiment, XML pages 250 may include tags 252 to identify information corresponding to an institution 252a, a catalog 252b currently used at an institution 60, a department 252c within such an institution 60, a degree 252d offered by a department 252c or college 252c, hours 252e needed to graduate with a selected degree, and the like. Within a selected degree, tags 252 identifying general education 252f, departmental 252g, and elective 252h courses may be provided. In certain embodiments, hours 252i and courses 252j corresponding to these requirements 252f-h may also be provided.

In a similar manner, XML pages 250 may include tags 252k identifying courses 126 offered by a particular institution 60. The course tags 252k may include other descriptive tags 252p including but not limited to credit hours corresponding to the course, description of subject matter taught by the course, prerequisites of the course, co-requisites of the course, and the like. Likewise, other XML pages 250 may include course schedule 136 information. For example, a course schedule tag 252m may identify scheduling information corresponding to a course 126. In addition, other tags 252r may identify a time that a course 126 is offered, days that a course 126 is offered, faculty teaching a course, locations where a course is taught, and the like. Likewise, any of multiple other tags 252n may be provided, as needed, to provide selected information.

Like HTML tags, XML tags may include a beginning tag 252a and an ending tag 253a that enclose information 254 or data 254 therebetween. For example, institution tags 252a, 253a may enclose the name of a university, such as the "University of Utah." Likewise, catalog tags 252b, 253b may enclose the year of a particular catalog 66 being described. Department tags 250c, 253c may enclose the name of a department or college. Each of the other tags 252d-r may enclose specific information, as needed.

Thus, the use of XML tags 252 or a standardized nomenclature 212 may facilitate the mining and comparison of information corresponding to different educational institutions 60 by a student or other individual. The tags 252 are simply presented by way of example and do not constitute an exhaustive list of all possible tags 252 that may be used. Therefore, the illustrated tags 252 are not intended to limit the scope of the present invention. In reality, a seemingly innumerable number of tags 252 could be established to identify various types of information corresponding to educational institutions 60, the likes of which are intended to be captured within the scope of the present invention.

In addition to XML pages 250, other pages 260 may be provided as needed in accordance with the invention. For example, pages 260 containing XSL 262, or extensible style sheet language 262, may be used to specify the style or manner of display of XML data. The XSL specification 262 may function as a style template, thereby enabling a designer to apply a single style to multiple XML pages 250. DTD 264, or document type definition 264, may be used to define tags and attributes used to describe content in an XML or HTML document. The DTD specification 264 may define those tags that are allowed as well as tags that may appear within other tags. Likewise, DOM 266, or document object model 266, may specify how objects in a web page are represented. This specification 266 enables programs and scripts to update the content, structure, and style of HTML and XML documents.

Figure 11:
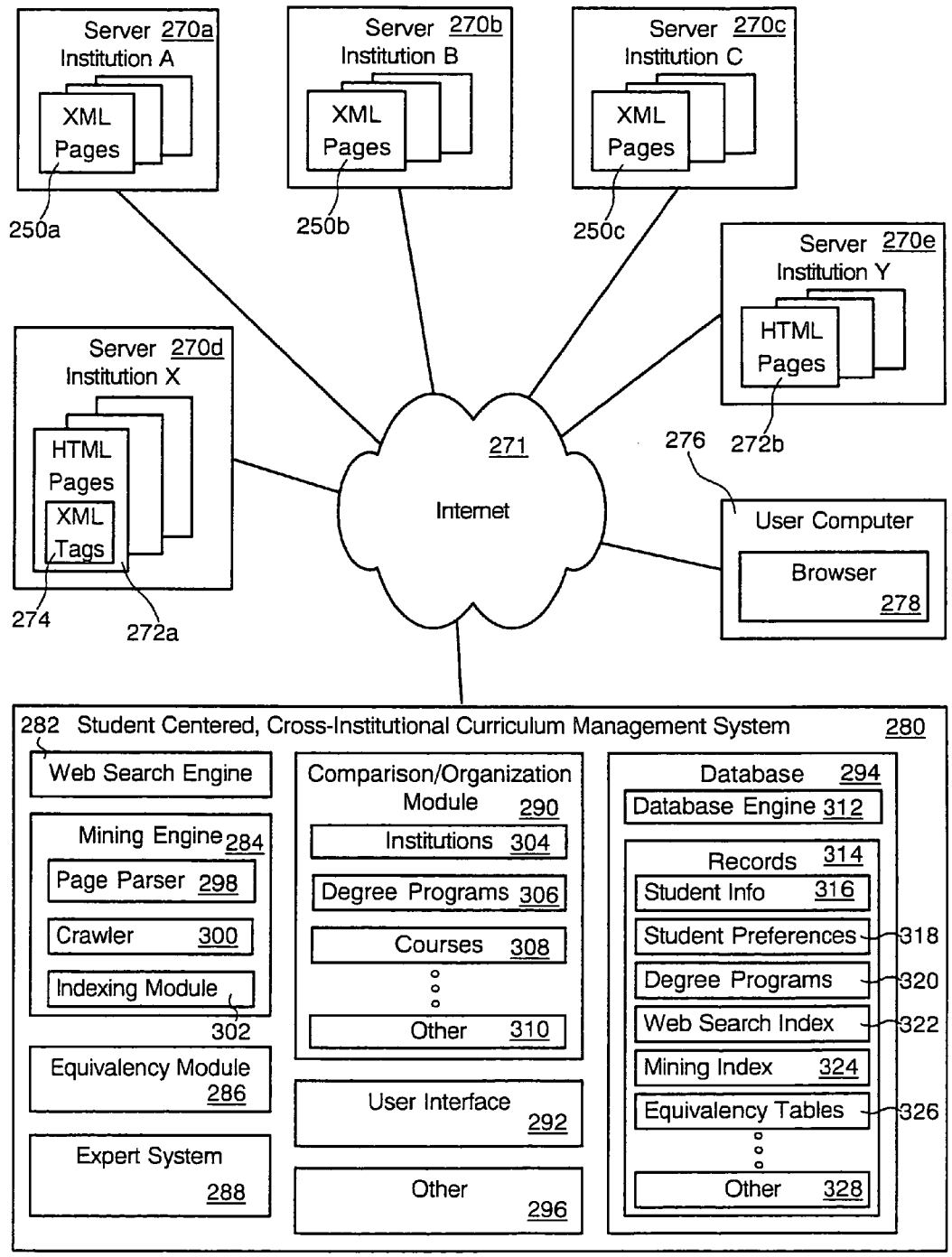
FIG. 11 is a schematic block diagram illustrating one embodiment of information corresponding to various educational institutions made available on a network, such as the Internet, and means for accessing, mining, and using the information.

Referring to FIG. 11, as described previously, institutions 60 may make information coded with XML tags available over a network, such as the Internet 271. For example, multiple institutions 60 may provide information on multiple servers 270a-c. Each of these servers 270a-c, may store and serve XML pages 250a-c containing information corresponding to each individual institution 60. This information may be made available to persons or entities having access to the Internet 271.

In another embodiment, a selected institution 60 may embed or retrofit existing HTML pages 272a with XML tags 274 identifying information within the pages 272a. An institution 60 may then place these pages 272a on a server 270d, where they may be served over the Internet 271. Likewise, in another embodiment, an institution 60 may refuse to or be unable to provide information identified with XML tags 252. Such an institution 60 may choose to exclusively provide HTML pages 272b on the Internet 271. In this instance, a party or entity independent from the institution 60 may take information from the institution's HTML pages 272b and code the information with XML tags 252. In certain embodiments, a user having a computer 276 may be able to access any of the information stored on the servers 270a-e through a browser 278.

A student-centered, cross-institutional curriculum management system 280 may be used to mine data from the servers 270a-e for use in managing a student's curriculum. In certain embodiments, the management system 280 may include a web search engine 282, a mining engine 284, an equivalency module 286, an expert system 288, a comparison or organization module 290, a user interface 292, a database 294, and other modules 296.

For example, a web search engine 282 may be specifically tailored to search for information offered by educational institutions 60 on web servers 270a-e. In presently contemplated embodiments, the web search engine 282 may enable a student to search for information corresponding to selected institutions 60, degree programs 64, courses 126, and the like. A mining engine 284 may include a page parser 298, a crawler 300, an indexing module 302, and the like. For example, a page parser 298 may be programmed to parse XML pages 250a-c, 274, or other available data located on the Internet 271, to extract desired information sought with respect to education. The page parser 298 may work with an indexing module 302 to identify and index information identified by tags 252 in the XML pages 250. In addition, a crawler 300 may be provided to scour the Internet 271 for information corresponding to educational institutions 60, degree programs 64, courses 126, and the like.

The management system 280 may also include an equivalency module 286 to determine the equivalency of degree programs 64 and courses 126 offered by different institutions 60. For example, although institutions 60 may offer courses 126 of identical or similar subject matter, these courses 126 may be identified with distinct course numbering systems. Thus, in certain embodiments, the equivalency module 286 may function by comparing the content of these courses 126 to identify equivalency therebetween. In certain cases, equivalency may be determined by specific policies of educational institutions 60 with respect to the transfer of credits therebetween.

The management system 280 may also include an expert system 288 to assist a student in planning, optimizing, and completing a degree program 64. The expert system 288 may identify selected preferences that a student may have with respect to a selected curriculum, and may plan the curriculum by retrieving information in accordance with the preferences.

The management system 280 may also include a comparison or organization module 290 for use by a student or other entity to compare or organize selected institutions 304, degree programs 306, courses 308 offered by institutions 60, or other criteria 310, as needed. A user interface 292 may function to enable a user to interact with the management system 280. For example, a user interface 292 may receive data in response to interrogatories presented to a user. Likewise, the user interface 292 may enable a user to select preferences with respect to his or her curriculum. The user interface 292 may also present, organize, and compare data, as needed, for a user.

Likewise, the management system 280 may include a database 294 including a database engine 312 and records 314. The database engine 312 may be effective to store, retrieve, modify and search records 314 within the database 294. Records 314 within the database 294 may include records corresponding to student information 316, student preferences 318, degree programs 320, indexes for searching the web 322, indexes 324 of information that has been mined over the Internet, equivalency tables 326 containing information with respect to normalizing the equivalency of courses 126 offered by various institutions 60, as well as other records 328.

In selected embodiments, any or all of the data provided over the Internet may be provided to a student or other individual on a self-contained mass storage media, such as a CD-ROM, DVD, or the like. For example, a CD-ROM may be created containing any or all of the structures illustrated in FIG. 11 in memory, rather than being stored in different physical systems. A CD-ROM containing selected catalogs 66, information with respect to selected institutions 60, schedules 136, and the like, could be provided to a student corresponding to a desired region, such as a city, state, or the like. In other embodiments, a customized CD-ROM could be provided containing only catalogs 66, institutions 60, schedules 136, and the like, that are desired by a particular student or individual.

Thus, an entire search or comparison may be performed from information entirely contained on a CD-ROM, DVD, or other mass storage medium. In other embodiments, part of a search or comparison may performed from information stored on a CD-ROM, while additional or more specific information may be gathered by logging onto the Internet. For example, selected planning may be performed offline. Once this planning is complete, a student may be connected online to register, download additional information, or the like.

Figure 12:
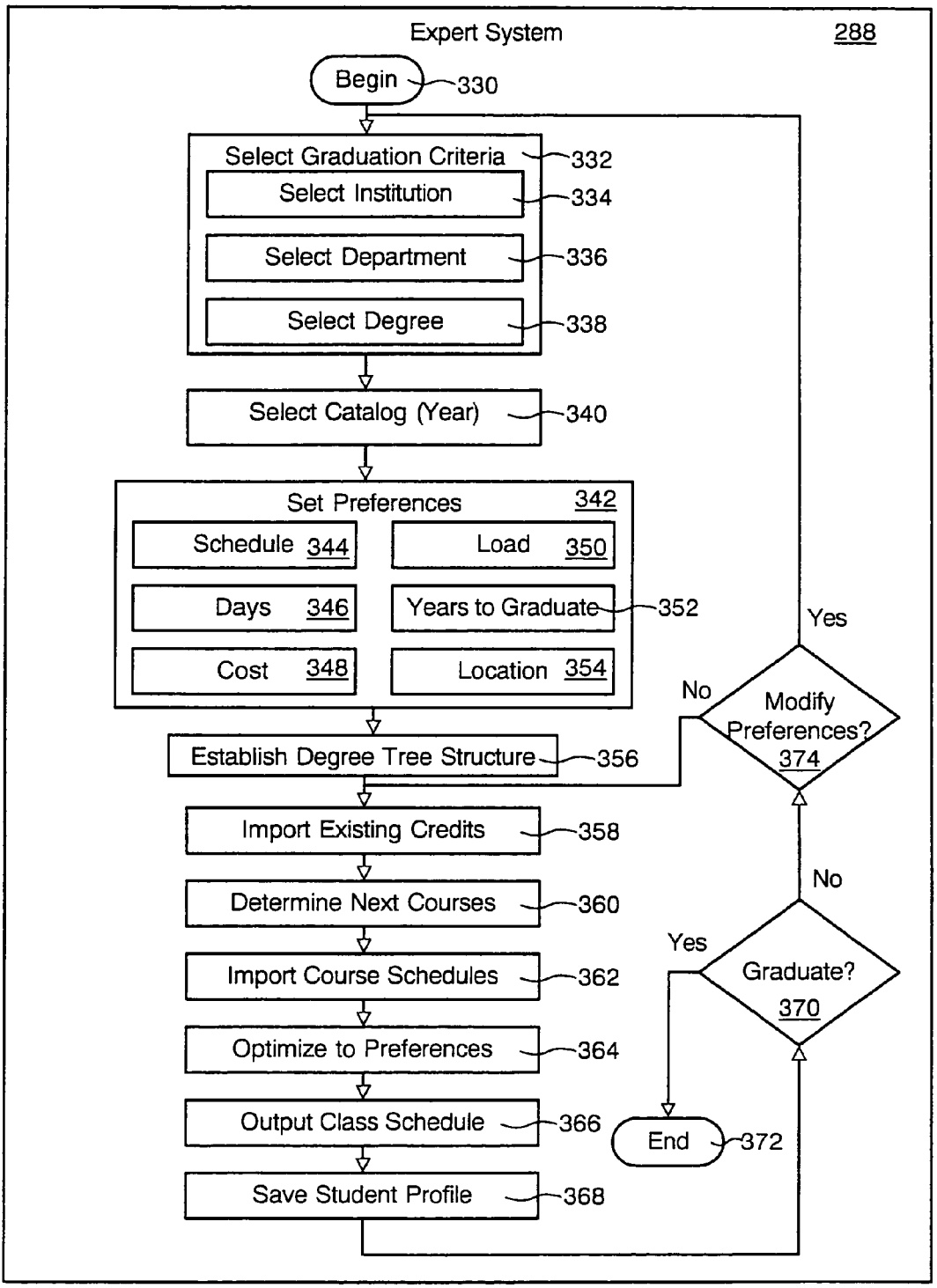
FIG. 12 is a schematic block diagram illustrating one embodiment of a process followed by an expert system in accordance with the invention.

Referring to FIG. 12, an expert system 288 for inclusion in the student-centered, cross-institutional curriculum management system 280 may begin 330 by enabling a student or prospective student to select graduation criteria 332. Selecting 332 graduation criteria may include selecting 334 an institution 60 from which to graduate, selecting 336 a department 62 or college 62 within the institution 60, and selecting 338 a degree program 64 within the department 62 or college 62. Once graduation criteria have been selected 332, a catalog 66 may be selected 340 but is typically fixed by having offered the degree. Selecting 340 a catalog 66 may simply refer to selecting a year to begin a degree program 64. Once a catalog 66 is selected 340, a student may select 342 preferences with respect to a selected degree program 64.

For example, a student may have certain preferences 342 with respect to a class schedule 344, such as preferred times of the day to take courses 126, preferred days 346 of the week to take courses, preferences with respect to cost 348, preferences with respect to a credit hour load 350 taken during a semester or other interval, years 352 in which a student desires to attend or graduate, preferred locations 354, maximum travel time, and the like. By inputting a student's preferences 342, the expert system 288 may acquire a set of parameters within which to plan a student's curriculum. The expert system 288 may then be able to optimize the student's curriculum more efficiently and rapidly than a student might be able to on his or her own.

Once preferences 342 are established, the expert system 288 may determine 356 or establish 356 a degree tree structure 180 in accordance with the selected graduation criteria 332. The degree tree structure 180 may serve as a map or template provided by the expert system 288 to assist a student in completing a degree program 64. The tree structure 180 embodies courses in sequence to accomplish the designated degree under the constraints of the catalog 66 and preferences 342.

Once the degree tree structure 180 is established 356, existing credits may be imported 358 into the tree structure 180. These existing credits 358 may be credits earned by a student taking courses 126 at another institution 60, received in high school, received at the student's current institution 60, received from taking exams, and the like.

Once the expert system 288 has established credits a student has already earned, and how the credits may be applied to a selected degree program 64, the expert system 288 may determine 360 a next set of courses 126 to be taken by the student. The expert system 288 may then import 362 course schedule 136 information either manually, from a student, from information mined over the Internet 271, or the like.

With the course schedule 136, the expert system 288 may create a class schedule 366 for the student. This class schedule 366 may be optimized 364 to the student's selected preferences 342. For example, if a student selects a preference 342 to take courses 126 close to a selected location 354, the expert system 288 may search for courses 126 that are taught by institutions 60 closest to the selected location 354. Likewise, the same process may be followed for each of the other preferences 342.

Once scheduling information has been imported 362 and the class schedule 366 has been optimized 364 to the student's preferences, the expert system 288 may proceed to output a class schedule 366 to the student. The class schedule 366 may be for a selected semester, multiple semesters, or the like. Once the class schedule 366 has been output, the expert system 288 may save 368 a student's profile for future use.

If the student graduates 370, upon completing a class schedule 366, then the process may end 372. However, if a student does not graduate 370 upon completing the class schedule 366, a student may be provided the opportunity to modify preferences 374 and other criteria. If a student does not desire to modify his or her preferences 374, the expert system 288 may proceed to import existing credits 358 earned from completing the class schedule 366 into the degree tree structure 180. If, however, the student desires to modify preferences 374, the student may modify criteria such as graduation criteria 332, or other preferences 342, with respect to a selected degree program 64.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for automatically creating and optimizing a curriculum of study across a plurality of educational offerings, the method comprising:
    preparing comprising
        identifying a first educational institution, offering a first plurality of courses and a plurality of degrees available over a series of terms constituting time periods, each degree thereof having corresponding requirements established by the first educational institution as conditions precedent for awarding the degree,
        identifying a second educational institution offering a second plurality of courses,
        identifying, by the computer system, equivalencies between courses of the first and second plurality of courses, and
        storing in the computer system the equivalencies;
    presenting, by the computer system over a computer network after the preparing, the plurality of degrees to a student;
    selecting, by the student over the computer network after the preparing, a first degree from among the plurality of degrees;
    selecting, by the student, criteria reflecting student preferences for at least one of time to graduate, course credit load, travel distance for attendance, and days of the week for attendance to be imposed by the computer system as constraints on completing the first degree,
    optimizing, by the computer system, a class schedule comprising selected courses and terms corresponding respectively thereto, selected from the first plurality of courses and the second plurality of courses and completing the requirements corresponding to the first degree within the constraints;
    presenting to the student, by the computer system over the computer network the class schedule as an individualized, dependency graph to the student.

2. The method of claim 1, wherein the preparing further comprises
    mining, over the network, by the computer system, first catalog information in a first course catalog corresponding to the first educational institution to identify the first plurality of courses, and
    identifying the second plurality of courses by mining second catalog information contained in a second course catalog corresponding to the second educational institution.

3. The method of claim 2, wherein the preparing further comprises:
    creating, by a third party unaffiliated with the first and second educational institutions, the standardized coding system; and
    delimiting analogous text in the first and second catalog information with standardized codes selected from the standardized coding system to enable comparison of the analogous text.

4. The method of claim 3, wherein delimiting further comprises delimiting the analogous text in the first and second catalog information with XML tags, and providing the analogous text in the form of XML pages available on the network.

5. The method of claim 3, wherein delimiting further comprises embedding XML tags into the source code of HTML pages containing the first and second catalog information.

6. The method of claim 3, wherein delimiting further comprises creating, by the third party XML pages identifying information in the first and second catalog information with XML tags.

7. The method of claim 3, wherein mining further comprises mining, over the network, information in the first and second catalog information by searching the standardized codes.

8. The method of claim 1, further comprising importing, by the computer system after the preparing, existing credits of the student into an institutional dependency graph reflecting graduation course requirements, prior to populating the dependency graph for use during the optimizing.

9. The method of claim 1, wherein the preparing occurs independently from all inputs from the student.

10. The method of claim 1, wherein:
    the identifying equivalencies further comprises creating, by the computer system, a plurality of sets, each set of the plurality of sets comprising courses from within the first and second plurality of courses that are substantially equivalent to each other in satisfying a degree requirement of a degree of the plurality of degrees; and
    the storing further comprises storing the plurality of sets within the database.

11. A method for optimizing a curriculum completing requirements for a degree, based on criteria specified by a student, the method comprising:
    identifying a first educational institution, offering a first plurality of courses and a plurality of degrees available for completion during a series of terms constituting time periods during which courses from the plurality of courses may be attended, each degree thereof having corresponding requirements established by the first educational institution as conditions precedent for awarding the degree;
    identifying a second educational institution offering a second plurality of courses;
    presenting, by the computer system over a computer network after the preparing, the plurality of degrees to a student;
    selecting, by the student over the computer network after the preparing, a first degree from among the plurality of degrees;
    selecting, by the student, criteria reflecting student preferences for at least one of time to graduate, course credit load, travel distance for attendance, and days of the week for attendance to be imposed by the computer system as constraints on completing the first degree;
    optimizing, by the computer system, a class schedule comprising establishing a correspondence between selected courses and selected terms;
    the optimizing, wherein the selected courses constitute a subset selected from the first plurality of courses and the second plurality of courses;
    the optimizing, wherein the selected terms constitute times for attendance in the selected courses resulting in completion of the first degree by the student, within the constraints.

12. The method of claim 11, further comprising:
    presenting to the student, by the computer system, over the computer network, the class schedule as an individualized, dependency graph.

13. The method of claim 12, further comprising:
mining, over the network, by the computer system, first catalog information in a first course catalog corresponding to the first educational institution to identify the first plurality of courses, and
identifying the second plurality of courses by mining second catalog information contained in a second course catalog corresponding to the second educational institution.

14. The method of claim 13, further comprising:
creating, by a third party unaffiliated with the first and second educational institutions, a standardized coding system; and
delimiting analogous text in the first and second catalog information with standardized codes selected from the standardized coding system to enable comparison of analogous text therebetween.

15. The method of claim 14, further comprising delimiting the analogous text in the first and second catalog information with XML tags, and providing the analogous text in the form of XML pages available on the network.

16. The method of claim 15, wherein delimiting further comprises embedding XML tags into the source code of HTML pages containing the first and second catalog information.

17. The method of claim 16, wherein delimiting further comprises creating, by the third party XML pages identifying information in the first and second catalog information with XML tags.

18. The method of claim 11, further comprising mining, over the network, information in the first and second catalog information by searching standardized codes embedded therein.

19. The method of claim 11, further comprising importing, by the computer system, existing credits of the student prior to the optimizing.

* * * * *